United States Patent [19]

Waggle et al.

[11] 3,991,221
[45] Nov. 9, 1976

[54] PROCESS FOR THE PRODUCTION OF PROTEIN FILAMENTS FROM A COOKED MEAT SOURCE

[75] Inventors: Doyle Hans Waggle, Webster Groves, Mo.; Kent John Lanter, Belleville, Ill.; John R. Doisy, Davis, Calif.

[73] Assignee: Ralston Purina Company, St. Louis, Mo.

[22] Filed: July 28, 1975

[21] Appl. No.: 599,792

[52] U.S. Cl. .............................. 426/513; 426/517; 426/641; 426/802
[51] Int. Cl.[2] ..................... A23J 3/00; A23L 1/31
[58] Field of Search ........... 426/516, 644, 515, 641, 426/513, 645, 511, 646, 506, 517, 802, 656, 657; 260/112 R, 121, 119, 123.5

[56] References Cited
UNITED STATES PATENTS

| | | | |
|---|---|---|---|
| 3,645,746 | 2/1972 | Akinson | 426/656 X |
| 3,662,672 | 5/1972 | Hoer | 426/656 |
| 3,814,823 | 6/1974 | Yang et al. | 426/802 X |
| 3,863,017 | 1/1975 | Yueh | 426/516 X |
| 3,870,805 | 3/1975 | Hayes et al. | 426/516 X |
| 3,891,774 | 6/1975 | Baker et al. | 426/802 X |
| 3,911,159 | 10/1975 | Heusdens | 426/657 X |

*Primary Examiner*—S. Leon Bashore
*Assistant Examiner*—Kenneth M. Schor
*Attorney, Agent, or Firm*—Virgil B. Hill

[57] ABSTRACT

A method of continuously forming elongated protein filaments from a cooked meat source is disclosed which comprises forming an aqueous slurry of a cooked meat source having a solids content of at least about 10 percent by weight and a pH of between about 3 and 10, followed by treatment of the noted slurry to provide a pumpable slurry with a viscosity ratio, as measured at a solids level of 15 percent by weight, to an uncooked meat slurry of substantially identical composition of at least about 1:2. Elongated protein filaments are thereafter formed from the slurry by continuously conducting the slurry under pressure through a heat exchanger and heating the slurry to a critical temperature of at least about 280° F. and preferably between about 310° – 335° F. while the protein is subjected to such temperature for a sufficient period of time so that elongated filaments are separated from the slurry. A higher temperature range is necessary with a "cooked" rather than uncooked protein source since it has been determined that once the protein source has been cooked it takes more heat to convert it to a protein filament than is required with an uncooked material. The heated slurry is continuously removed from said zone through an orifice and discharged into a collecting zone whereby the elongated filaments are separated from the remaining constituents of the slurry. The noted process provides a distinct improvement over prior art processes which were dependent upon the need for an "uncooked" protein source to permit texturization, and discloses a critically defined set of temperature conditions for the production of protein filaments from a protein source which heretofore has been considered unusable in texturization processes.

19 Claims, 2 Drawing Figures

PROCESS FOR THE PRODUCTION OF PROTEIN FILAMENTS FROM A COOKED MEAT SOURCE

BACKGROUND OF THE INVENTION

The present invention generally relates to a process for the production of edible protein filaments from a cooked protein source material.

Food scientists have long been interested in using a wide variety of protein sources to produce primary food products which resemble meat. Among the most sought for alternatives have been processes for converting protein sources such as oilseed meals, flours, cereal proteins and microbial proteins into a more acceptable protein food product, particularly those that would resemble meat in texture. This impetus has resulted in the development of a wide variety of techniques to produce textured protein food products resembling meat. A common technique has been the wet spinning process disclosed in U.S. Pat. No. 2,682,466 to R. A. Boyer. The wet spinning process generally produces protein fibers by extruding a plurality of fine streams of an aqueous solution of protein into an acid, chemical coagulating bath. The protein coagulates into fine fibers which are then collected and treated to form an edible textured protein product. Other methods of producing textured protein products resembling meat have included a shred-like protein product by heat coagulation of undenatured protein as diclosed in U.S. Pat. No. 3,047,395 to Rusoff, et al.

Since the development of these early processes for forming textured protein products from a variety of edible protein sources, expanded, textured products have since been produced by the extrusion of a proteinaceous source through an environment of elevated pressure and temperature into an environment of substantially lower pressure, with resultant puffing and expansion thereof. The expanded cellular product has textural characteristics upon rehydration with water which is very similar to a cooked piece of meat. Extrusion techniques for the production of expanded cellular protein product, especially those derived from oilseed meals, are described in U.S. Pat. No. 3,488,770 and U.S. Pat. No. 3,496,858.

More recently, a process for the production of textured protein filaments from a wide variety of protein sources has been disclosed, and provides a method of producing textured protein without a requirement for special equipment, thereby avoiding a large capital expenditure in order to commercialize the process. The noted process has involved the heating of a slurry of a proteinaceous material by conducting the slurry through a heat exchanger at a proteinaceous solids level of between about 0.3 and 35 percent by weight, under pressure, and heating the same for a sufficient period of time so that elongated filaments can be caused to separate from the remaining constituents of the slurry. The heated slurry is thereafter continuously removed from the heat exchange zone through a back pressure creating orifice wherein discrete elongated filaments and the remaining constituents of the slurry are discharged into a collecting zone and separated. The protein filaments thereby formed are useful in making a wide variety of food products and may be conveniently incorporated with conventional primary meat sources to form food products having improved aesthetic appeal, flavor and economy. Processes of the above type which may be employed to form this unique elongated protein filament, include those described in U.S. Pat. Nos. 3,662,671, 3,662,672, 3,821,453 and Reissue No. 28,091. The noted patents describe a wide variety of proteinaceous materials which may be used to produce the fibers pursuant to the process disclosed therein, including vegetable protein such as soy or other oilseed meals, animal protein such as albumen or casein, microbial protein, such as those derived from yeast or petroprotein. The process disclosed therein has proven to be an effective solution to the attendant problems associated with other prior art processes for the production of textured protein products from protein sources.

In spite of the tremendous advantages which the above identified processes for the production of the elongated protein filaments provide; nevertheless, these and other prior art processes were entirely dependent upon the presence, at least in part, of a protein source which would commonly be considered as "uncooked" or had not been subjected to any degree of heating or chemical treatment to thereby render the same in an undenatured state. It was generally determined that in most of the prior art processes for the texturization of protein, at least some percentage of uncooked protein was necessary to permit the formation of a textured product. Therefore, in spite of the success of the above identified processes for the production of protein products resembling meat, there has still existed a need for an effective means of texturizing a protein source such as an entirely "cooked" meat or a protein source which has been effectively heated or in a substantially denatured state prior to texturization.

Up to this particular point in time, the only alternative insofar as using a cooked protein source, in forming a textured protein food product, and the like, was to employ additives or binding agents with which the cooked meat could be combined and thereby compressed into a roll or placed in a casing to result in an integral structure for the noted product. The resulting product, however, has a very artificial appearance, and the protein source during subsequent treatment and handling thereof, lost any textural qualities which a consumer would normally associate with a primary protein source, such as meat, which had been freshly cooked. It would, therefore, be highly desirable if a process could be devised which would permit the restructuring or texturing of "cooked" protein sources which have heretofore been considered unusable in protein texturizing processes of the prior art.

The instant invention obviates the above identified difficulties, and provides a process for the restructuring or texturing of "cooked" protein sources to form desirable and edible food products. The process disclosed herein represents an improvement on the processes generally set forth in U.s. Pat. Nos. 3,662,671, 3,662,672, Reissue No. 28,091 and U.S. Pat. No. 3,821,453 by defining a certain set of critical conditions including critical temperature limitations for the production of elongated protein filaments from a "cooked" rather than an "uncooked" protein source. For a complete understanding of the instant invention and for one to be able to determine the protein sources to which it applies, it was felt to be necessary to define the protein sources to which the present invention is deemed to be operative, and hence the term "cooked." This is necessary since this term is capable of a very subjective definition, depending upon individual desires and tastes. In this regard, it was determined pursuant to the instant invention that a proper definition of this term could only be made by examining the individual constituents of the protein source, and the resultant effect of heating, chemical treatment or cooking upon these constituents and, therefore, arrive at an acceptable definition of the noted term based upon the effects of cooking on various individual constituents of the protein source. In this regard, it was determined that the well recognized technique of gel electrophoresis provided a particularly effective means of separating and identifying the individual constituents of the meat source thereby permitting an evaluation of the effect of heating or cooking on these constituents. In this manner, the definition of the term "cooked" as it is employed in the instant invention was arrived at. Insofar as the present invention, the term "cooked" is defined as that stage of heating or treatment when the intensity of electrophoretic bands of the particular meat source having a relative mobility of between about 0.13 and 0.32 has been substantially reduced as measured by polyacrylamide gel electrophoresis. An electrophoretic pattern of uncooked or raw meat sources, contains a substantial percentage of unknown components, probably heat sensitive enzymes within the noted relative mobility range of the electrophoretic pattern. The application of heat, chemical treatment and accordingly, the degree of cooking, will effect the relative intensity of these enzymes or whatever particular materials correspond to these bands, and a substantial reduction in intensity of these bands would, therefore, represent that point in time when a protein source is "cooked." The present invention is, therefore, intended to apply to the use of "cooked" protein sources as is defined by the above terminology, since by this definition the term "cooked" can be used to distinguish those protein sources of the present invention from those employed in texturization processes of the prior art. As previously noted, these prior art texturization processes required at least the partial presence of a raw or uncooked protein source.

It is, therefore, an object of the instant invention to provide a process for the production of edible protein filaments from cooked meat sources.

It is a further object of the instant invention to provide a process for the production for elongated protein filaments from a protein source which is economically feasible and reliable to practice on a commercial scale.

It is also an object of the present invention to define a process for the production of edible protein filaments from a cooked meat source as represented by a critically defined set of conditions in order to produce a protein filament with a high degree of aesthetic appeal resembling a primary meat product.

It is also an object of the present invention to provide an elongated protein filament which is usable in a wide variety of food products.

SUMMARY OF THE INVENTION

The present invention, therefore, provides a process for the production of elongated protein filaments from a cooked meat source or a proteinaceous meat material and comprises forming a slurry of the noted proteinaceous material with water, the slurry having a proteinaceous solids content of at least about 10% by weight and a pH of between about 3 and 10. The slurry is then formed into a pumpable slurry by treating the slurry to provide a viscosity ratio, as measured at a solids level of 15 percent by weight, to an uncooked meat slurry of substantially identical composition of at least about 1:2. Discrete elongated filaments of the meat source are formed by continuously pumping the slurry under pressure through a heat exchange zone and heating the slurry to a temperature of at least 280° F. and preferably between about 310° – 335° F. for a sufficient period of time to form elongated protein filaments from the slurry. The heated slurry is thereafter continuously removed from said zone, preferably through a back pressure creating orifice and discharged into a collecting zone whereby the elongated filaments are separated from the slurry and recovered. The noted process for the production of edible protein filaments from a cooked meat source is provided by a critical set of conditions including temperature control, pH, and solids for the production of elongated protein filaments from a cooked meat source. The critical temperature range in the instant process with cooked meat is specifically distinguishable from that temperature range required with an uncooked protein source, which is employed in the processes set forth in U.S. Pat. Nos. 3,662,671, 3,662,672, 3,821,453 and Reissue No. 28,091. It is believed that generally higher temperature conditions are needed since after the protein source has been cooked it takes more heat to convert it to a protein filament than is required with an uncooked or raw material. It has been determined, for example, that the protein filaments derived from "cooked meat sources" are highly functional, yet still provide the resultant flavor and texture of the primary protein source in an uncooked condition. The use of a "cooked meat" material in a restructuring or texturization process is highly significant since it provides a use for a heretofore unusable and economical protein source because meat can be easily and efficiently separated from the nonedible portions of a carcass by a simple cooking procedure together with mechanical deboning thereof. This type of cooking procedure together with a mechanical deboning operation has a further advantage in reducing the bacterial contamination problems associated with the deboning of raw meat because of the preliminary cooking step. The instant process permits the texturing of a cooked "meat" material thereby providing a more efficient process for the utilization of edible meat portions in various food products since the filaments produced herein are highly functional in various types of food applications. The present invention, therefore, is felt to be a distinct improvement over the processes disclosed in U.S. Pat. Nos. 3,662,671, 3,662,672 and Reissue No. 28,091 since it provides a critical set of conditions for the production of edible elongated protein filaments from a heretofore unusable protein source which has been heated or cooked to such an extent that the protein is in a denatured state.

DESCRIPTION OF THE PREFERRED EMBODIMENTS

Figure 1:
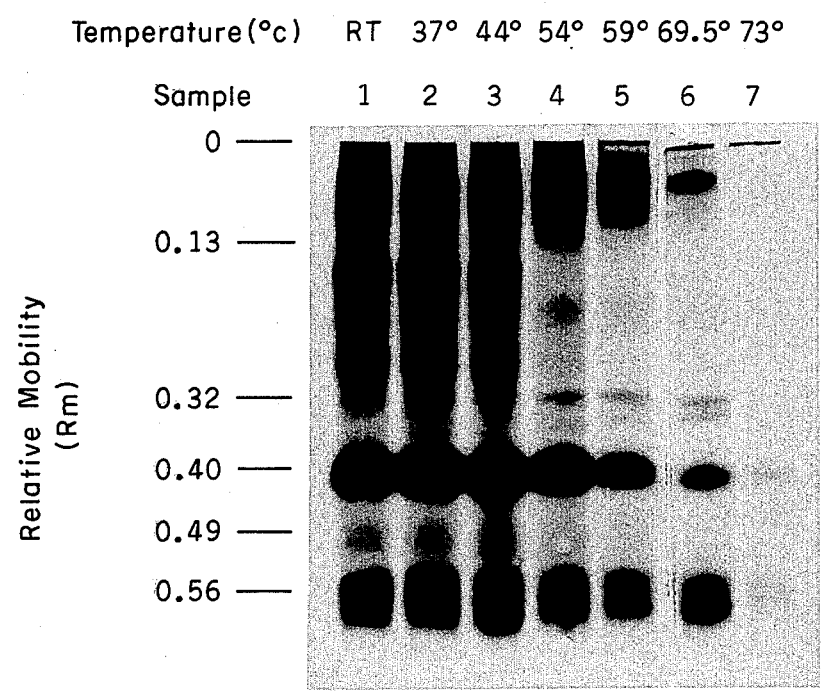
FIG. 1 depicts the electrophoretic pattern on polyacrylamide gel of various samples of beef which have been heated to different temperatures, illustrating that point in time at which cooking of the meat occurs.

The present invention in providing a process for the production of elongated protein filaments from a cooked meat source provides an unexpected advantage since the restructuring of heretofore unusable protein sources is provided pursuant to the process of the instant invention. As previously noted, the term "cooked" as it is intended to be applied to the degree of heat treatment of various protein sources is capable of a very subjective definition depending upon individual desires and tastes. Accordingly, it was felt pursuant to a better understanding of the instant invention that a proper definition of this term was necessary in order to define the scope of materials to which the instant invention is intended to apply. This particular definition is based upon an examination of the individual constituents of the protein sources and the resultant effect of heating, chemical treatment, or cooking upon these constituents. In this regard, a number of "cooked" meat sources may be employed in the present invention and a very broad definition is to be given to the term "meat source." Among the meat sources suitable are animal tissue, meat by-products, poultry meal, fish meal, rendered meat and meat meal, as well as meat and bone meal. The term animal is used in the broadest possible sense as meaning mammals, both land based and aquatic, fowl, fish and crustaceans. Typical meat sources which may be employed in the present invention and derived from animals include the flesh or by-products of chicken, pork, fish, beef, turkey etc. The term meat source is further not intended to be limited strictly to the cooked animal tissue but may include the cooked by-products of meat processing such as meat meal, fish meal, poultry meal, meat and bone meal and the like.

As previously noted, the term "cooked" as it is intended to apply to the present invention and as a means of differentiating the meat source employed in the present invention from those meat or protein sources in an "uncooked" condition is defined as that stage of heating or treatment when the intensity of the electrophoretic bands of the protein source having a relative mobility of between about 0.13 and 0.32 has been substantially reduced as measured by polyacrylamide gel electrophoresis. The term "substantially" is further intended to refer to the point where greater than 90 percent of the intensity of the electrophoretic bands within the noted relative mobility range has disappeared as compared to a sample of raw or uncooked meat of the same type. As previously noted, it is felt that the electrophoretic pattern of meat sources, especially fresh meat tissue, contains a substantial percentage of heat sensitive enzymes within the noted relative mobility range of the electrophoretic pattern. The application of heat or chemical treatment and accordingly the degree of cooking will effect the relative appearance of enzymes or materials corresponding to these bands, and a substantial reduction in intensity of any bands in this particular relative mobility range would represent a cooked protein source as contrasted with an uncooked protein source of the same type whose electrophoretic pattern or polyacrylamide gel would have bands with a strong intensity within this relative mobility range. The present invention is, therefore, intended to apply only to the use of "cooked" meat sources, as defined by the above terminology.

Polyacrylamide gel electrophoresis is a well known technique for the separation of proteinaceous components including enzymes, proteins and the like and the present invention employs polyacrylamide gel electrophoresis as a means of defining the term "cooked" and hence protein sources to which the present invention is intended to apply. Polyacrylamide gel electrophoresis as employed in the instant invention, for the purpose of defining the term "cooked," includes the use of a polyacrylamide gel containing acrylamide at a concentration of about 8 percent by weight. The gel is formed by the addition of the acrylamide to a stock buffer containing tris hydroxyl methyl amino methane, a salt of ethylenediamine tetra acetic acid, and boric acid, having a constant thickness of about 6 milemeters. Following the preparation of the gel it was immersed in the aqueous buffer described below and distilled water extracts of the meat sources which have been concentrated to about one third (⅓) that of their original volume were then applied in 50 microliter quantities to the origin of the gel. The gel is again immersed in an aqueous buffer containing about 1.0 percent by weight tris hydroxymethyl amino methane of about 0.13 percent by weight of a salt of ethylenediamine tetra acetic acid and about 0.08 percent by weight of boric acid. Electrophoresis was performed by equilibrating the system at 100V for 15 minutes to allow the sample to penetrate the gel followed by the application of a constant voltage for about 4 hours with the power set at 200 volts. After electrophoresis, the gel is removed and stained with amido black stain solutions, and then destained with a mixture of Methanol: water: acetic acid (4:4:1 vol/vol) followed by 15 percent acetic acid in water (vol/vol) for the purposes of identifying the separated components of the meat source materials. The electrophoresis technique employed in the present invention is generally described in *Journal of Food Science*, Volume 39, page 428 (1974).

Figure 2:
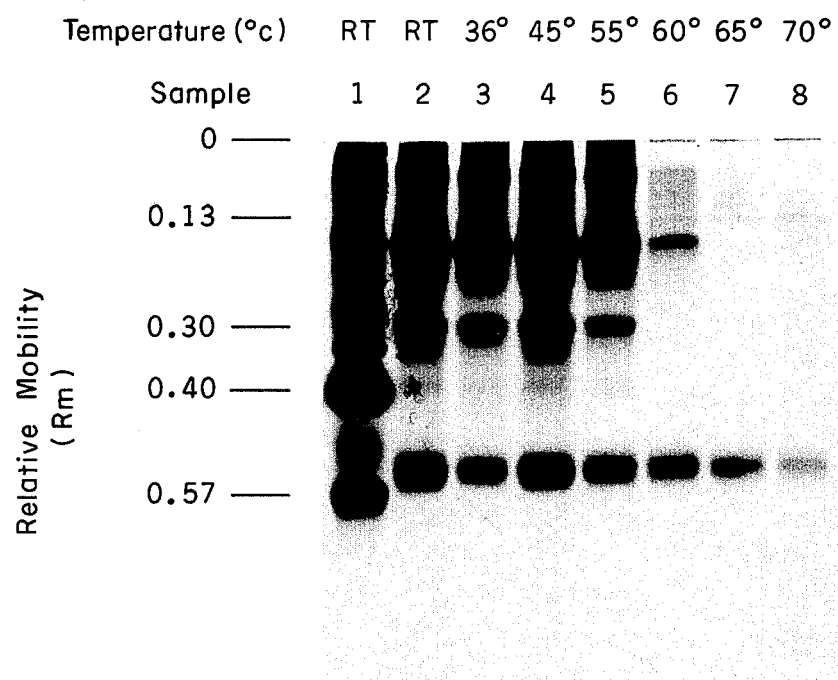
FIG. 2 depicts the electrophoretic pattern on polyacrylamide gel of various samples of turkey which have been heated to different temperatures illustrating that point in time at which cooking of the meat occurs.

With specific reference to FIG. 1, the electrophoretic pattern of a beef emulsion is shown which has been subjected to various product cooking temperatures of between 37° and 73° C. Sample 1 is beef that was held at room temperature and is "uncooked," sample 2 was heated to a product temperature of 37° C, sample 3 to 44° C., sample 4 to 53.5° C, sample 5 to 59° C., sample 6 to 69.5° C. and sample 7 to 73° C. The noted temperatures are further intended to refer to the temperatures of the products themselves as measured by thermo couples embedded in the products during heating of the meat source materials. The figures along the Y axis of the drawing denotes a scale for the measurement of the relative migration of the separated components of the proteinaceous mixture. The relative mobility ($R_m$) is defined as the distance of component migration, divided by the distance of indicating dye solution migration. Therefore, it may be seen that at a relative mobility of between about 0.13 and 0.32 and as the temperature of the meat exceeds 44° C. that a substantial disappearance or reduction in intensity of electrophoretic bands within the noted relative mobility range has taken place, thereby indicating that the proteinaceous source is cooked. As the temperature exceeds this, it may be observed that additional bands gradually disappear other than those within the noted relative mobility range. The stage at which the bands or components within the noted mobility range disappear, however, is the point at which the source can be termed as having been cooked. With reference to FIG. 2, an illustration is made of the "cooking" process for a different protein source, wherein sample 1 is beef at room temperature for purposes of comparison which is "uncooked," sample 2 is turkey held at room temperature and therefore "uncooked," sample 3 is turkey heated to 36° C., sample 4 is turkey to 45° C., sample 5 is turkey to 55° C., and sample 6 is turkey to 60° C., sample 7 is turkey to 65° C., and sample 8 is turkey to 70° C. It may be seen from an examination of the electrophoretic pattern of the turkey samples which have been heated to these various product temperatures, that within the noted relative mobility range of between about 0.13 to 0.32, a substantial disappearance or reduction in intensity of electrophoretic bands occurs at a product temperature of at least about 55° C. specifically with samples 6, 7 and 8 which had been heated to product temperatures above this minimum level. It may, therefore, be seen that although a different minimum temperature and time exists for the complete cooking of turkey as contrasted with beef, the two proteinaceous sources have, however, as a common denominator, the substantial disappearance or reduction in intensity of electrophoretic pattern components with a relative mobility of between about 0.13 and 0.32 as measured by polyacrylamide gel electrophoresis. This test, as has been generally described, is therefore intended to define those meat sources to which the present invention is intended to be limited since as previously noted, the term "cooked" is a subjective term depending upon individual tastes and desires and the noted definition is believed to be necessary for a proper understanding of the scope of the present invention.

A "cooked" meat source as defined in the present invention, is formed into an aqueous slurry having a proteinaceous solid content of at least about 10 percent by weight with a preferred range of solids of between about 20 and 25 percent by weight. The noted minimum level of solids is also critical to the production of the protein filaments of the present invention, with a cooked meat source, since it has been determined that if the solids content of the noted slurry is less than about 10 percent by weight, no filaments are formed and the instant process is completely inoperative insofar as the production of protein filaments from cooked meat sources. By contrast the upper limit insofar as solids of the slurry of a "cooked" meat source is not critical to the practice of the instant invention and the slurry can have a solids content of 35 percent or more by weight, depending on the limitations of the pump used for conveyance of the slurry to the heat exchanger. The present invention is, therefore, not intended to be restricted by an upper limit insofar as solids in the slurry used in the production of the protein filaments of the instant invention. The level of protein in the aqueous slurry is further not critical to the practice of the instant invention, with the limiting factor on the amount of proteinaceous material being that sufficient to provide a minimum solids content of at least about 10 percent by weight.

The slurry of the cooked meat source having the noted solids content, is then adjusted to a pH which may vary between about 3 and 10. If the pH is allowed to exceed about 10, the protein no longer forms filaments but gels rapidly and makes a rubbery-like structure. Furthermore, if the pH is below about 3, a similar result occurs. Therefore, the specific pH range which is preferred for the purposes of the present invention is dependent upon the texture desired in the filaments produced since depending on the exact pH employed, a different type of texture is obtained. For example, if the pH of the slurry is controlled to between about 7 and 9, the filaments produced are continuous, elongated and very elastic and rubbery in texture whereas if the pH is controlled to between about 3 and 6, the fibers are more chewy and meat-like in nature. Therefore, the latter pH range is normally more desirable insofar as simulating the natural texture of meat and in the production of structured protein food products therewith. Therefore, a preferred range for pH insofar as the slurry of a cooked meat source is employed in the present invention is between about 3 and 6.

Following the formation of the aqueous slurry having the noted solids content and pH, a pumpable slurry is formed by treating the slurry to provide a viscosity ratio as measured at a solids level of 15 percent by weight, to an uncooked meat slurry of substantially identical composition of at least about 1:2. Providing the noted viscosity for a slurry of a cooked meat source provides a slurry which will be readily pumped and continuously produce protein filaments under the conditions of temperature and pressure in the heat exchanger. The particular manner in which formation of the pumpable slurry is carried out is not considered to be critical to the practice of the process of the instant invention and may include homogenization, or finely grinding the aqueous slurry as for example in a Comitrol grinding apparatus using a microcut head in order to reduce the particle size of the meat source to a sufficiently low level to provide a suitable viscosity. Cooked meat slurries have a much lower viscosity than slurries having a substantially identical composition but which are composed of "uncooked" protein materials. For example, although the actual viscosity of the proteinaceous slurry itself will vary considerably depending on the types of protein material employed, or the solids content of the slurry, etc.; nevertheless, because of the relatively poor hydration characteristics and insoluble nature of a "cooked" meat source, slurries containing a cooked meat source have viscosity ratios compared to a substantially identical slurry containing uncooked meat of greater than about 1:2 as measured at a solids level of 15 percent by weight. In other words, a slurry with uncooked protein will have a viscosity more than twice that of the slurry of substantially identical composition containing a cooked meat source. With a cooked meat source, therefore, a pumpable slurry of the proteinaceous material is formed by treating the slurry to provide a viscosity ratio of at least about 1:2 as measured at a solids level of 15 percent by weight, as compared to the viscosity of an uncooked meat slurry of substantially identical composition. The cooked proteinaceous material in the slurry is the used to form edible protein filaments under the critical conditions of temperature in a heat exchanger or steam injection zone employed in the formation of the protein filaments of the instant invention.

After a pumpable slurry is formed, the elongated protein filaments are formed by continuously pumping the proteinaceous slurry under pressure through a heat exchange zone and heating the slurry to a temperature which is at least about 280° F. but is less than that which will degrade the protein. The minimum temperature at which the present process is operative, insofar as a cooked meat source, is at least about 280° F. in the heat exchange zone. It has further been determined that the noted minimum temperature is critical for the formation of suitable elongated protein filaments from a "cooked" meat source. This particular minimum temperature needed with a cooked meat source is contrasted with the minimum temperature which is necessary in the formation of protein filaments from an "uncooked" proteinaceous source which can vary as low as about 240° F. In this regard, if a temperature below 280° F. is employed insofar as the texturization of a cooked meat source pursuant to the process disclosed herein, no protein filaments are formed at all. It has further been determined that a preferred minimum temperature for the formation of the protein filaments from a cooked meat source pursuant to the instant invention is at least about 310° F. There is no real upper limit on the temperature for the heat exchange zone; however, since this will be determined solely by the effect of the heat on the protein and it is only necessary to employ a temperature below that which will degrade or adversely affect the protein. Therefore, the upper limit insofar as the temperature is not deemed to be critical insofar as practice of the instant invention. A typical temperature range will vary between about 280° and 335° F. with a preferred temperature range of 310° – 335° F. It is believed that a higher level of heat is necessary in the production of filaments from a "cooked" meat source slurry as contrasted with an uncooked meat source slurry since it takes more heat to convert the proteinaceous material into a protein filament once the proteinaceous source has been cooked.

The process of the instant invention can be most conveniently carried out on a heat exchanger device very commonly used in the dairy food industry. The device in its most simple form consists of a continuous piece of tubing preferably stainless steel, with the tubing suitably jacketed to be either heated or cooled and thus serve as a heat exchanger device on whatever material is conducted through the tubing. The tubing may be entirely jacketed and capable of heat exchange or may be intermittently jacketed to consist of a plurality of intermittent heat exchange zones all of which may be maintained at different temperatures if desired. A typical heat exchanger apparatus will, therefore, usually involve three heat exchange zones in a continuous arrangement on the stainless steel tubing. Thus, in order to meet the requirements of elevated temperature and pressure as is necessary in the production of the filamentous protein structures from the cooked meat sources in the present invention the zones will normally all be maintained at an elevated temperature. However, all three zones may be so maintained or alternately the third heat exchange zone near the end of the tubing may be a cooling instead of a heating zone for cooling of the slurry prior to its exit from the heat exchanger. For the present process, the area immediately following the last heat exchange zone and upon exit from the heat exchanger is referred to as a collecting zone. This is normally the environment of atmospheric pressure and temperature into which the slurry is ejected from the heat exchanger and in which the filamentous protein structures are formed, although it may be desirable to employ as a collection zone a circulating water bath or moving air stream for the purposes of more efficiently collecting the filamentous protein materials.

Pressure in the present process for the formation of the filamentous protein structures can be attained if desired by placing a restricted orifice on the exit end of the heat exchanger. The use of a restricted orifice in combination with the pumping or conducting of the slurry under confinement, in the tubing preferably creates a back pressure for filament formation and helps control the shape of the product. In general, circular orifices having single or multiple openings with a diameter of between about 0.15 and 0.30 inches on a ⅜ inch OD tube has proven to be satisfactory for most applications. However, a rectangular shaped orifice with dimensions of 0.375 × 0.0625 inches on a ⅜ inch OD tube has also been used to produce filamentous protein structures although the filaments are flattened somewhat by the rectangular orifice.

Another device for performing the present process of producing protein filaments from a cooked meat source which is a well known piece of equipment is a "jet cooker." It also performs the process of the present invention by heating the slurry under pressure by conduction through a zone under confinement whereby heat is applied followed by conduction through an orifice into a collection or cooling zone to form protein filaments. Specifically, however, with a jet cooker the slurry of cooked proteinaceous material is passed through adjacent jet nozzle orifices of the jet cooker which are concentric in nature. These jet nozzle orifices of the cooker comprise an injection zone whereby the mixture is heated and pressurized by steam added to the slurry and ejected along with the slurry from the jet nozzle orifices and intersecting flow patterns into a cooling or collecting zone. The cooling or collecting zone is normally the surrounding environment of atmospheric temperature and pressure. The time interval of the slurry in the jet nozzle is estimated to be about 1 second or less. The nozzle orifice through which the slurry is ejected is normally small, being only ⅛ inch or so in diameter. The amount of steam which is used as a heating or pressurizing agent by injection into the slurry is not great, normally being an amount which will not lower the solids content of the suspension more than 1 to 2 percent by weight. The injection of steam to heat the slurry in combination with the confinement of the slurry and the use of the jet nozzle orifices of the jet cooker create an environment of pressure which is needed for the formation of the filamentous protein fibers of the present invention.

The process may be operated over a wide pressure range and the pressure is primarily created by the use of a restricted orifice in combination with heating and confinement of the slurry. The pressure attained will, therefore, in great part be dependent upon the specific type of equipment employed. For example, with heat exchanger devices, pressures varying between about 50 and 5000 psig in the pump may be employed although the pressure differential in the heat exchanger is rarely over 130 psi whereas with a jet cooker or similar type of device which uses steam injection the pressure is usually about 80 – 100 psig.

Pursuant to a better understanding of the instant invention, the following examples describing various specific parameters of the instant process and their effect on the products produced therewith are set forth.

EXAMPLE 1

50 pounds of ground beef were steamed in a foil covered roasting pan from ½ to 1½ hours until the internal temperature of the beef reached approximately 55° C. Polyacrylamide gel electrophoresis of a sample of the steamed product was carried out as follows:

A sample of the beef was ground and mixed thoroughly. Thereafter a 20g portion was weighed into a flask and placed in a water bath for 30 minutes until the sample attained a constant temperature. The sample was then removed and cooled to below 25° C. A 15g sample was taken, to which was added 30ml of distilled water, followed by homogenization of the mixture and centrifugation to remove insoluble matter. The extract was filtered and concentrated to about 1/3 of its original volume.

Gel electrophoresis was performed on an E C Model 470 vertical gel cell, manufactured by E. C. Apparatus Corporation, Philadelphia, Pennsylvania. A polyacrylamide gel was prepared by dissolving 34.2g acrylamide, 1.8 bis-acrylamide, 0.6 ammonium persulfate in 45 ml of a stock buffer containing 300g tris-hydroxymethyl amino methane, 39g of a salt of ethylene diamine tetra acetic acid, and 23g of boric acid. The entire mixture was diluted to a volume of 450 ml with water to provide an 8 percent gel which was immersed in the aqueous buffer described below. A 6 mm thickness of the gel was employed to which the samples of extract were then added. Following sample application, the gel was again immersed in the stock buffer which had been diluted with water 1:9 (volume/volume). Electrophoresis was then performed by equilibrating the system at 100V for 15 minutes to allow the samples to penetrate the gel followed by the application of a constant voltage of 200 volts for 4 hours. The gel was removed and stained with an amido black stain (0.7g amido black per 100 ml methanol : water : acetic acid (4/4/1 volume/volume). Destaining of the gel was carried out by preliminary treatment with a solution of methanol : water : acetic acid (4/4/1 volume/volume) with a final treatment by a 15 percent acetic acid in water solution (volume/volume). Visual observation of the electrophoretic pattern of the steamed beef indicated the substantial absence of any intense electrophoretic bands at a relative mobility of between about 0.13 and 0.32 thereby indicating that the beef was cooked. A pumpable slurry of the ground beef was prepared by grinding or homogenizing the cooked beef in a Comitrol grinder with a 180 blade micro cut head manufactured by Urschel Manufacturing Company, Valparaiso, Indiana. The resulting slurry of cooked beef had a viscosity as measured at a 15 percent solids level on a Brookfield LTV viscometer of about 1000 cps as compared to a substantially identical slurry of uncooked ground beef from the same 50 pound batch of beef which had a viscosity of about 3,000 cps, thereby having a viscosity ratio of the uncooked meat slurry of 1:3.

The homogenized slurry of cooked beef was adjusted to a solids content of 25 percent by weight and the pH adjusted to 4.1. Thereafter, the homogenized slurry having the noted pH and solids content, was pumped through a heat exchanger made up of 60 feet of 3/8 inch OD stainless steel tubing in a 6 inch pipe. The temperature of the heat exchanger was maintained within the range of 322° – 327° F. Individual filaments of the cooked beef were obtained which were elongated and very fine in texture with an appealing aroma of roast beef. Analysis of the protein filaments obtained indicated a moisture content of 76.0 percent, a fat content of 5.49 percent and a protein content of 16.2 percent.

EXAMPLE 2

50 pounds of ground pork were steamed in a foil covered roasting pan from 1/2 to 1 1/2 hours until an internal temperature of approximately 55° C. was obtained. Polyacrylamide gel electrophoresis of the steamed product was carried out as generally described in Example 1. Visual observation of the electrophoretic pattern of the steamed pork indicated the substantial absence of any intense electrophoretic bands at a relative mobility of between about 0.13 and 0.32 thereby indicating that the ground pork was cooked. A pumpable slurry of the ground pork was prepared by finely grinding or homogenizing the cooked pork in a Comitrol grinder with a 180 blade microcut head manufactured by Urschel Manufacturing Company, Valparaiso, Indiana. The resulting slurry had a viscosity as measured at a solids of 15 percent by weight on a Brookfield LTV viscometer of 800 cps as compared to a slurry of "uncooked" ground pork of substantially identical composition taken from the same 50 pound batch of ground pork which was determined to have a viscosity of about 4,000 cps, thereby having a viscosity ratio to the uncooked meat slurry of 1:5. The resultant homogenized slurry was then adjusted to a pH of 4.6 and the slurry was determined to have a solids content of 40 percent by weight. Thereafter, the pH adjusted, homogenized slurry was pumped through a heat exchanger made up of 60 feet of 3/8 inch OD stainless steel tubing in a 6 inch pipe. The temperature of the heat exchanger was maintained within the range of 322° – 327° F. Filaments were produced from the cooked pork slurry which were very fine in texture and had the aroma and taste of pork. Analysis of the filaments produced from the noted slurry had a moisture content of 64.5 percent, a fat content of 19.3 percent, and a protein content of 15.6 percent.

EXAMPLE 3

50 pounds of mechanically deboned chicken meat were steamed in a foil covered roasting pan from 1/2 to 1 1/2 hours or until the internal temperature of the deboned meat reached approximately 55° C. Polyacrylamide gel electrophoresis of the steamed product was carried out as generally described in Example 1 and visual observation of the electrophoretic pattern of the cooked, deboned meat indicated the substantial absence of any intense electrophoretic bands at a relative mobility of between about 0.13 and 0.32 thereby indicating that the deboned meat was cooked. A quantity of the deboned meat was used to prepare a pumpable slurry by finely grinding or homogenizing the cooked meat in a Comitrol grinder with a 180 blade micro cut head manufactured by Urschel Manufacturing Company, Valparaiso, Indiana. The resulting slurry had a viscosity as measured at a solids level of 15 percent on a Brookfield LTV viscometer of 300 cps as compared to a slurry of uncooked mechanically deboned chicken meat from the identical 50 pound batch which had a viscosity of about 1800 cps, thereby having a viscosity ratio to the uncooked meat slurry of 1:6. The resultant slurry was adjusted to a pH of 4.5 and the noted slurry further had a solids content of 34 percent by weight. The pH adjusted homogenized slurry was then pumped through a heat exchanger made up of 60 feet of 3/8 inch OD stainless steel tubing in a 6 inch pipe. The temperature of the heat exchanger was maintained generally within the range of 322° – 327° F. Elongated protein filaments were produced from the slurry comprising very fine and delicate filaments with a very light color and a delicate chicken like smell. Analysis of the resultant filaments indicated a moisture content of 64.8 percent, a fat content of 11.6 percent and a protein content of 16.6 percent by weight.

EXAMPLE 4

50 pounds of mechanically deboned turkey meat were steamed in a foil covered roasting pan for ½ to 1½ hours until an internal temperature of 55° C. was obtained. Polyacrylamide gel electrophoresis of the steamed turkey meat was carried out as generally described in Example 1. Visual observation of the electrophoretic pattern of the steamed turkey indicated the substantial absence of any intense electrophoretic bands at a relative mobility of between 0.13 and 0.32 thereby indicating that the turkey was cooked. A quantity of the cooked turkey was then used to prepare a pumpable slurry by finely grinding or homogenizing the cooked turkey in a Comitrol grinder with a 180 blade micro cut head manufactured by Urschel Manufacturing Company, Valparaiso, Indiana. The resulting slurry had a viscosity as measured at 15 percent solids on a Brookfield LTV viscometer of about 800 cps as compared to a slurry of uncooked, deboned turkey meat taken from the identical lot of material and which had a viscosity of 4800 cps, thereby having a viscosity ratio to the uncooked meat slurry of at least about 1:6. The resultant slurry was adjusted to a pH of 4.5 and had a solids content of about 31 percent by weight. The pH adjusted slurry was then pumped though a heat exchanger made up of 60 feet ⅜ inch OD stainless steel tubing in a six inch pipe. The temperature of the heat exchanger was maintained within the range of 322° – 327° F. Very fine and delicate protein filaments were obtained having a very light color with good aroma and taste. Analysis of the protein filaments obtained from the cooked turkey slurry indicated a moisture content of 67.0 percent by weight, a fat content of 12.9 percent by weight and a protein content of 19.7 percent by weight.

EXAMPLE 5

Frozen, whole tuna fish was sawed into 2½ inch thick slabs and thawed at room temperature. The thawed slabs of tuna fish were then steamed until the internal temperature of the fish reached approximately 55° C.

Polyacrylamide gel electrophoresis of the steamed product was carried out as generally described in Example 1. Visual observation of the electrophoretic pattern of the steamed fish indicated the substantial absence of any intense electrophoretic bands at a relative mobility of between about 0.13 and 0.32, thereby indicating that the slabs of tuns were "cooked." Quantities of the "cooked" tuna dish were then used to prepare elongated protein filaments in order to illustrate the effect of pH and solids of the slurry as well as temperature upon formation of the protein filaments from the cooked meat source.

The effect of the pH of the pumpable slurry of "cooked" meat on the formation of elongated protein filaments therefrom was evaluated by preparing 11 samples of pumpable slurry from the "cooked" tuna, and generally controlling the solids content of each of the slurries to within a range of 18–27 percent. Individual pumpable slurries were prepared by finely grinding or homogenizing the "cooked" tuna in a Comitrol grinder manufactured by Urschel Manufacturing Company, Valparaiso, Indiana with a 180 blade micro cut head. The resulting slurries each had a viscosity as measured at a solids level of 15 percent, on a Brookfield LTV viscometer of about 200 cps as compared to a slurry of "uncooked" tuna fish of identical composition which had a viscosity of about 1500 cps, thereby having a viscosity ratio to the uncooked meat slurry of about 1:8. Each of the homogenized slurries were then adjusted to a pH as set forth in Table 1, and the pH adjusted slurries were then individually pumped through a heat exchanger made up of 60 feet of ⅜ inch OD stainless steel tubing in a six inch pipe. The temperature of the heat exchanger was maintained generally within the range of 320° – 325° F. The properties of the elongated fibers made from the eleven different pH adjusted slurries were evaluated and determined to be as follows:

TABLE 1

Effect of pH on the Formation of Protein Filaments from a Cooked Meat Source

| Sample No. | pH (slurry) | % Solids (slurry) | Remarks |
|---|---|---|---|
| 1 | 2.1 | 26% | No fibers produced, only a gelled mass |
| 2 | 2.9 | 21% | Fibers produced, but they subsequently gelled into stringy mass |
| 3 | 3.6 | 23% | Fibers produced, but they subsequently gelled into stringy mass |
| 4 | 4.6 | 22% | Good fibers produced |
| 5 | 4.8 | 23% | Good fibers produced |
| 6 | 5.5 | 25% | Good fibers produced |
| 7 | 6.3 | 27% | Good fibers, very elongated |
| 8 | 8.5 | 26% | Good fibers, very elongated |
| 9 | 10.1 | 26% | Good fibers, very elongated |
| 10 | 10.5 | 18% | Fibers, but they gelled into stringy mass (odor of ammonia) |
| 11 | 11.1 | 21% | No fibers produced, only a gelled mass |

It may be seen from the above experiment that satisfactory protein filaments were produced from cooked meat slurries having a pH generally within the range of 3–10 whereas if a pH above this were used, the protein began to deteriorate as evidenced by the evolution of ammonia. At a pH below this range the slurry began to gel and not only became quite difficult to pump but was incapable of forming protein filaments under the conditions of processing.

The effect of temperature on the formation of protein filaments from a cooked meat source was evaluated by preparing four different slurries from the "cooked" tuna as described above. Each of the slurries had a solids content of 25 percent by weight and was forced into a pumpable slurry through the above described Comitrol grinding apparatus with the resultant slurries of cooked meat having a viscosity on the order of 200 cps as measured at a solids level of 15 percent by weight as compared to a slurry of nearly identical composition of uncooked meat having a viscosity on the order of 1500 cps, thereby having a viscosity ratio to the uncooked meat slurry of about 1:8. The pH of each of the slurries was adjusted to 5.0 and then passed through a heat exchanger consisting of 60 feet of ⅜ inch OD stainless steel tubing in a six inch pipe. The exit temperature of the heat exchanger was then varied to evaluate the effect of temperature on the formation of protein filaments with the results described in Table 2.

TABLE 2

Effect of Heat Exchange Zone Temperature on the Formation of Protein Filaments from a Cooked Meat source

| Sample No. | % Solids (slurry) | pH (slurry) | Temp. (° F) | Remarks |
|---|---|---|---|---|
| 1 | 24 | 5.0–5.1 | 240–245° F. | No fibers produced |
| 2 | 24 | 5.0–5.1 | 265–270° F. | Very short fibers, poor fiber formation |
| 3 | 24 | 5.0–5.1 | 297–300° F. | Short, intermediate length fibers |
| 4 | 24 | 5.0–5.1 | 330–335° F. | Excellent fibers quite elongated |

The results indicate that while some degree of fiber formation took place as low as 265° F., the fibers produced were so short and mealy in nature so as to be nearly microscopic. As 280° F. was approached, the fibers produced were still short but at least were macroscopic and visible to the unaided eye. As a temperature of 300° F. was achieved, the fibers were clearly continuous in nature upon exit from the heat exchanger, although of a shorter length than fibers produced at a higher temperature. As temperatures above 315° F. were achieved, the fibers were of excellent quality being continuous, elastic filaments of protein with a desirable physical appearance and texture. It may, therefore, be seen based on the above experiment that a generally higher temperature is necessary to produce protein filaments from a "cooked" meat slurry as compared to an "uncooked" protein slurry as set forth in U.S. Pat. Nos. 3,662,671, 3,662,672, 3,821,453 and Reissue No. 28,091 which was operative at a temperature as low as 240° F.

The effect of solids content of the slurry on the formation of protein filaments from a cooked meat source was also evaluated by preparing different pumpable slurries from the "cooked" tuna as described above. Each of the slurries were passed through the above described Comitrol grinding apparatus to form a pumpable slurry, each of which was adjusted to a pH of 4.4 with the exception of one slurry which was adjusted to a pH of 7.6. The slurries were adjusted to varying solid levels of between 9 and 32 percent by weight. Each of the slurries was passed through a heat exchanger consisting of 60 feet of ⅝ inch OD stainless steel tubing in a 6 inch pipe. The exit temperature of the heat exchanger was held at 330° F. and the effect of slurry solids content on the formation of the protein filaments was evaluated with the results described in Table 3.

TABLE 3

Effect of Slurry Proteinaceous Solids Content on the Formation of Protein Filaments from a Cooked Meat Source

| Sample No. | % Solids (slurry) | pH (slurry) | Temp. ° F. | Remarks |
|---|---|---|---|---|
| 1 | 32 | — | — | Slurry could not be pumped into heat exchanger because of pump limitations |
| 2 | 27 | 7.6 | 330° | Good, elongated filaments |
| 3 | 20 | 4.4 | 330° | Good, elongated filaments |
| 4 | 17 | 4.4 | 330° | Good filaments but of shorter length |
| 5 | 14 | 4.4 | 330° | Good filaments but short length |
| 6 | 12 | 4.4 | 330° | Very short filaments |
| 7 | 10 | 4.4 | 330° | Microscopic filaments |
| 8 | 9 | 4.4 | 330° | No filaments produced |

It may be seen that over the above identified solids range of generally 10 – 30 percent by weight that acceptable protein filaments were produced whereas if the solids level was below this range, filaments could not be produced from a cooked meat source.

The above examples are merely illustrative of the instant invention and it will be understood that various other changes in the details, materials or steps which have been described may be made without departing from the spirit of the instant disclosure, and such changes and other modifications are intended to be included within the scope of the instant disclosure and appended claims.

We claim:

1. A method of continuously forming elongated protein filaments from a cooked meat source comprising:
   a. forming an aqueous slurry of a proteinaceous material, said slurry having a proteinaceous solids content of at least about 10 percent by weight with a pH between about 3 and 10, said proteinaceous material consisting of a cooked meat source;
   b. forming a pumpable slurry by treating the slurry to provide a viscosity ratio, as measured at a solids level of 15 percent by weight, to an uncooked meat slurry of substantially identical composition of at least about 1:2;
   c. forming elongated protein filaments by continuously pumping the proteinaceous slurry under pressure through a heat exchange zone and heating the slurry to a temperature of at least about 280° F. but less than that which will degrade the protein, while the protein is subjected to such temperature for a sufficient period of time so that elongated filaments are separated from the remaining constituents of the slurry, continuously removing the heated slurry from said zone through an orifice and discharging the formed elongated filaments and remaining constituents of the slurry into a collecting zone;
   d. in said collecting zone separating the elongated protein filaments from the remaining constituents of the slurry and recovering said filaments.

2. A method as set forth in claim 1 wherein said slurry is heated to a temperature of at least about 310° F.

3. A method as set forth in claim 1 wherein said slurry is heated to a temperature of between about 310° F. and 335° F.

4. A method as set forth in claim 1 wherein said slurry has a solids content of between about 20 – 25 percent by weight.

5. A method as set forth in claim 1 wherein said slurry has a pH of between about 7 and 9.

6. A method as set forth in claim 1 wherein said slurry has a pH of between about 3 and 6.

7. A method as set forth in claim 1 wherein said slurry is processed at a pressure of between about 50 and 5000 psig.

8. A method as set forth in claim 1 wherein the step of treating the slurry is performed by grinding the slurry.

9. A method of continuously forming elongated protein filaments from a cooked meat source comprising:
   a. forming an aqueous slurry of a proteinaceous material, said slurry having a proteinaceous solids content of at least about 10 pecent by weight with a pH between about 3 and 10, said proteinaceous material consisting of a cooked meat source;
   b. forming a pumpable slurry by treating the slurry to provide a viscosity ratio, as measured at a solids level of 15 percent by weight, to an uncooked meat slurry of substantially identical composition of at least about 1:2;
   c. forming elongated protein filaments by continuously pumping the proteinaceous slurry under pressure through a heat exchange zone and heating the slurry to a temperature of at least about 310° F. but less than that which will degrade the protein while the protein is subjected to such temperature for sufficient period of time so that elongated filaments are separated from the remaining constituents of the slurry, continuously removing the heated slurry from said zone through an orifice and discharging the formed elongated filaments and remaining constituents of the slurry into a collecting zone;
   d. in said collecting zone separating the elongated protein filaments from the remaining constituents of the slurry and recovering said filaments.

10. A method as set forth in claim 9 wherein said slurry has a solids content of between about 20 – 25 percent by weight.

11. A method as set forth in claim 9 wherein said slurry is heated to a temperature of between about 310° F. and 335° F.

12. A method as set forth in claim 9 wherein said slurry is processed at a pressure of between about 50 and 5000 psig.

13. A method as set forth in claim 9 wherein the step of treating the slurry is performed by grinding the slurry.

14. A method of continuously forming elongated protein filaments from a cooked meat source comprising:
   a. forming an aqueous slurry of proteinaceous material, said slurry having a proteinaceous solids content of at least about 10 percent by weight with a pH between about 3 and 10, said proteinaceous material consisting of a cooked meat source;
   b. forming a pumpable slurry by treating the slurry to provide a viscosity ratio as measured at a solids level of 15 percent by weight, to an uncooked meat slurry of substantially identical composition of at least about 1:2;
   c. forming elongated protein filaments by continuously pumping the slurry under pressure through an injection zone whereby steam is injected into said slurry to heat the slurry and heating the slurry to a temperature of at least about 280° F. but which is less than that which will degrade the protein while the protein is subjected to such temperature for a sufficient period of time so that elongated tender filaments are separated from the remaining constituents of the slurry, continuously removing the heated slurry from said zone through an orifice and discharging the formed discrete elongated filaments and remaining constituents of the slurry into a collecting zone;
   d. in said collecting zone separating the protein filaments from the remaining constituents of the slurry and recovering said filaments.

15. A method of claim 14 wherein the slurry is processed at a steam pressure of between about 80 and 85 psig.

16. The method of claim 14 wherein the slurry is heated in the heat exchange zone to a temperature of at least about 310° F.

17. The method of claim 14 wherein the slurry is at a pH of between about 3 and 6.

18. The method of claim 14 wherein the slurry has a solids content of between about 20 – 25 percent by weight.

19. The method of claim 17 wherein said slurry has a pH of between about 3 and 6.

* * * * *